G. W. BARKER.
Churn-Dashers.
No. 145,272.  Patented Dec. 9, 1873.
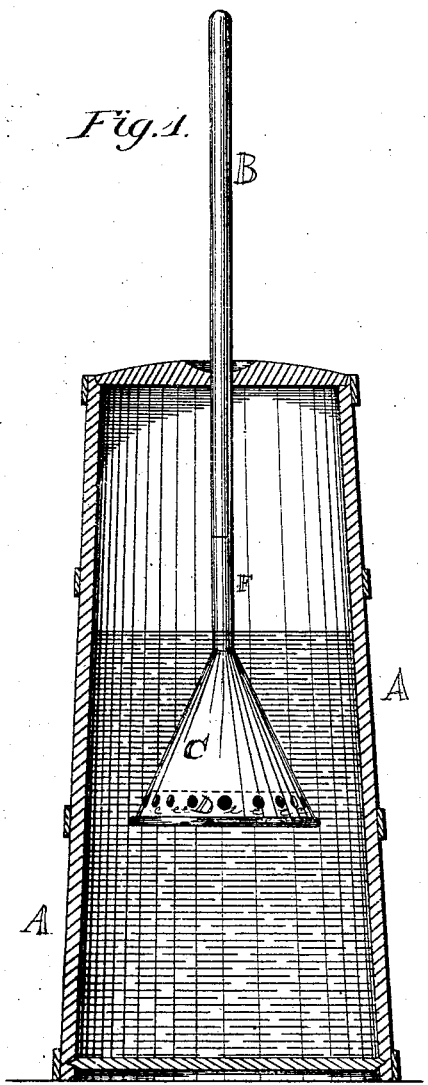
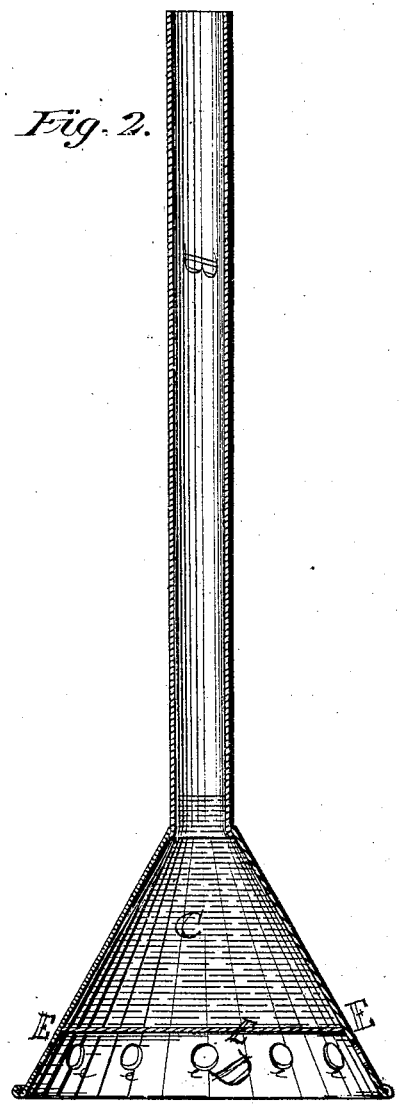
Attest:
Inventor:
George W. Barker
per U. J. Baxter, Atty

UNITED STATES PATENT OFFICE.

GEORGE W. BARKER, OF ST. JOHN'S, MICHIGAN.

IMPROVEMENT IN CHURN-DASHERS.

Specification forming part of Letters Patent No. 145,272, dated December 9, 1873; application filed July 31, 1873.

*To all whom it may concern:*

Be it known that I, GEORGE W. BARKER, of St. John's, in the county of Clinton and State of Michigan, have invented certain new and useful Improvements in Churn-Dashers; and I do hereby declare the following to be a full, clear, and exact description of the invention, such as will enable others skilled in the art to which it pertains to make and use it, reference being had to the accompanying drawings, which form part of this specification.

This invention relates to that class of churns, in which means are provided for regulating the temperature of the contents. It consists of a dasher of the particular construction shown and described, in which is provided a large receptacle for holding hot or cold water, either of which is introduced as it may be desired, to raise or lower the temperature of the cream in the churn, the water being poured into the receptacle or reservoir through the tubular handle by which the dasher is operated.

In the accompanying drawing similar letters of reference in the different figures refer to like parts.

Figure 1 is a vertical section of a churn, showing the dasher in position for operation. Fig. 2 is a vertical section through the dasher and handle.

A, Fig. 1, shows a churn of the ordinary construction, in which is used a reciprocating dasher. B is the dasher, provided with my improved means for changing the temperature of the contents of the churn, consisting of the conical receptacle or reservoir C, and also having a continuation of the exterior shell of the reservoir, as shown at D, which is provided with a series of perforations, $e$, through which and between the outer edge of the dasher and the churn, the cream passes, when the dasher is moved vertically. Secured to the upper part of the reservoir C is the tubular handle F, by means of which the dasher receives its reciprocating movement, and through which hot or cold water is poured when it is desired to change the temperature of the contents of the churn.

It will be seen that by this arrangement the temperature of the cream in the churn may be quickly changed without increasing its bulk or condition, as it must be when water is poured directly into it, as is commonly done, in order to produce the same result.

B, Fig. 2, is a vertical section of the hollow tube, open at the top, and connected with the upper portion, C, of the hollow conical base C D, said base being provided above its perforated rim D with a diaphragm, E, forming, with the said upper portion C and the hollow tube B, a water-receptacle for changing the temperature of the cream, as shown.

Having thus described my invention, I claim as new, and desire to secure by Letters Patent, the following:

A churn-dasher consisting of the hollow tube B, the conical base C with perforated rim D and diaphragm E, all constructed as shown and described.

In testimony that I claim the foregoing I have hereunto set my hand and seal this 26th day of July, 1873.

GEORGE W. BARKER. [L. S.]

Witnesses:
 ROBERT YOUNG,
 GEO. A. WELLS.